J. Spratt
Fruit Can,
No. 1,593. Reissued Dec. 22, 1863.
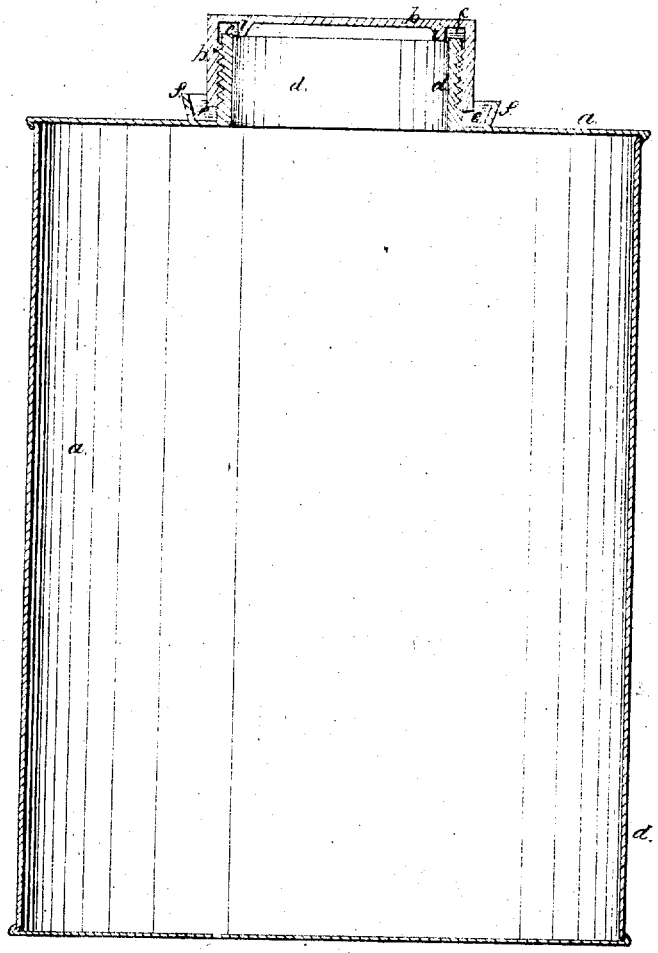
Witnesses:
A. DeLacy
J. Vitharner
Inventor:
L. & H. Griffin
by
L. & P. McIntire
Atty.

UNITED STATES PATENT OFFICE.

JOHN F. GRIFFEN, OF NEW YORK, N. Y., ASSIGNEE OF JAMES SPRATT, OF CINCINNATI, OHIO.

IMPROVEMENT IN SEALING FRUIT-CANS.

Specification forming part of Letters Patent No. 11,332, dated July 18, 1854; Reissue No. 1,593, dated December 22, 1863.

*To all whom it may concern:*

Be it known that JAMES SPRATT, of Cincinnati, in the State of Ohio, has invented certain new and useful Improvements in Self-Sealing Cans, of which the following is a full, clear, and exact description, reference being had to the accompanying drawing and the letters of reference marked thereon.

Previous to my invention it has been customary in preserving fruits, vegetables, &c., to put up or inclose such articles in glass jars and tin cans hermetically sealed by covering over the stopper, (or joint between it and the jar,) in the use of glass jars, with some sort of sealing-wax or composition, and by soldering up the joint between the lid and can in the use of tin cans. The metallic can possesses many advantages for general use over any other kind of preserve-jar; but in the use of this kind of vessel for putting up or preserving articles the operation of soldering it up to hermetically seal it requires considerable experience and care, besides a knowledge of the use of soldering-tools. These practical difficulties in the employment of metallic vessels and the imperfections, experience, expense, and trouble involved in the use of jars hermetically sealed with solder, and the objections to those stopped and sealed with wax, have so far prevented a very extensive practice of the art of preserving fruits and vegetables, and rendered such articles put up for use in hermetically-sealed vessels comparatively rare and costly.

My invention has for its objects to avoid all the practical difficulties heretofore encountered in putting up articles for consumption in hermetically-sealed vessels, and thus afford to the public an abundant and economical supply of preserved fruits, vegetables, &c., by furnishing for putting up such articles a self-sealing can or jar which shall possess within itself the elements necessary to hermetically sealing it, so embodied or combined as that no soldering is ever necessary, and so that any inexperienced person can employ it with facility and successfully; and to these ends my invention may be said to consist in the employment, in connection with a can and its cover, of an elastic packing, when these several parts are so constructed and arranged as that the packing shall be compressed between the can and its cover to make a tight joint and hermetically seal the vessel.

My invention also consists in the employment, in combination with an elastic packing arranged between the surfaces of a can and its cover, of sealing-wax or other composition, to insure the permanent and perfect exclusion of air from the interior of the can, all as hereinafter more fully explained.

To enable those skilled in the art to make and use my invention, I will now proceed to describe the construction and operation of my self-sealing can, referring by letters to the accompanying drawing, making part of this specification, in which I have represented the can in a vertical central (or axial) section.

*a* is a tin can, made about cylindrical in its shape, and formed with a neck, *d*, on the exterior of which is cut a screw-thread.

*b* is a cover or capsule which has a screw-thread cut on the interior of its cylindrical portion, to match into the thread on the exterior of neck *d*, so that the cover or cap *b* may be screwed over the neck *d*, as clearly shown.

*c* is the elastic packing, which may be of vulcanized rubber or any other suitable and impervious substance, and which is arranged in the interior of the cap or cover *b* (in the form of a washer) in such manner as to come on top of the cylindrical top edge of neck *d* and be confined and compressed between it and the under surface of cover *b*.

On the top or upper portion of can *a*, and surrounding the neck *d*, there projects upward a fillet or flange, *f*, which forms a sort of annular dish around the neck *d*, for the reception of sealing-wax or other composition, which may sometimes be employed, as will be presently explained. The lid *b* is formed with an annular rib or projection, *i*, (on its inner face,) between which and the interior of the cylindrical portion the packing-ring *c* is confined and compressed. When it is desired to hermetically seal the can, (the air being wholly or nearly all expelled in the usual manner,) the lid *b*, with its packing *c*, is screwed down over the neck *d* until the upper edge of the neck *d* comes in contact with and is impressed into the rubber or other elastic packing, *c*, as shown in the drawing, and a perfectly-tight joint is formed between the can *a* and its cover *b*.

In the manufacture of my self-sealing cans it may be found that sometimes, on account of inaccuracies in the packing-ring or in the surfaces between which it is confined, a perfectly air-tight joint will not be formed; or it might sometimes occur that, in consequence of some chemical effect on the packing *c* during long exposure to the effects of the contents of the can and the atmosphere on the outside, the said packing would become pervious to air. To guard against such contingencies the annular dish formed by the flange *f* may be filled in with wax or other cementing composition, as shown in red at *e*, which, it will be seen, will cover the lower end or edge of the cylindrical portion of cover *b* and effectually prevent the ingress of any air to the interior of the can *a* in the event of the packing *c* becoming defective. I consider the packing sufficient if the parts are all accurately made, and only provide the annular dish to be filled with wax or other cement in case it should be deemed expedient where the packing is to be exposed to any tendencies to render it pervious, or where the parts are not reliably made, and a perfectly air-tight joint is necessary.

It will be understood that the shape and general mode of construction of the can and its top may be varied at pleasure, and the packing, and also the can or jar, may be made of any suitable materials. I have shown a metallic can, and in this connection a simple screw-cap; but with jars of other material it may be deemed expedient to provide some other means than the screw for compressing the elastic and impervious packing and holding the parts together. I do not therefore wish to confine myself, in practicing my invention, to any design or material of the jar and cover, or to any particular kind of elastic and impervious packing, or to the precise relative positions of the packing-cover and jar-neck, or to the screw, as shown, for securing the lid and can together with the packing between them.

I am aware that a washer or packing has been used previous to my invention to make a tight joint between the two parts of a vessel fitted and secured together. I do not, therefore, broadly claim the use of a washer as packing between the two parts of a vessel; but, Having explained the construction of my improved preserve-can, what I claim therein as new, and desire to secure by Letters Patent, is—

1. The employment, in combination with the can or jar and its cover, of an elastic and compressible packing-ring of vulcanized rubber or its equivalent, substantially as and for the purpose set forth.

2. The employment of wax or other sealing material, in combination with a can or jar and its cover, when a packing is employed between the jar and its cover for the purpose set forth.

JNO. F. GRIFFEN. [L. S.]

Witnesses:

J. N. McINTIRE.

M. M. LIVINGSTON.